Patented Oct. 4, 1932

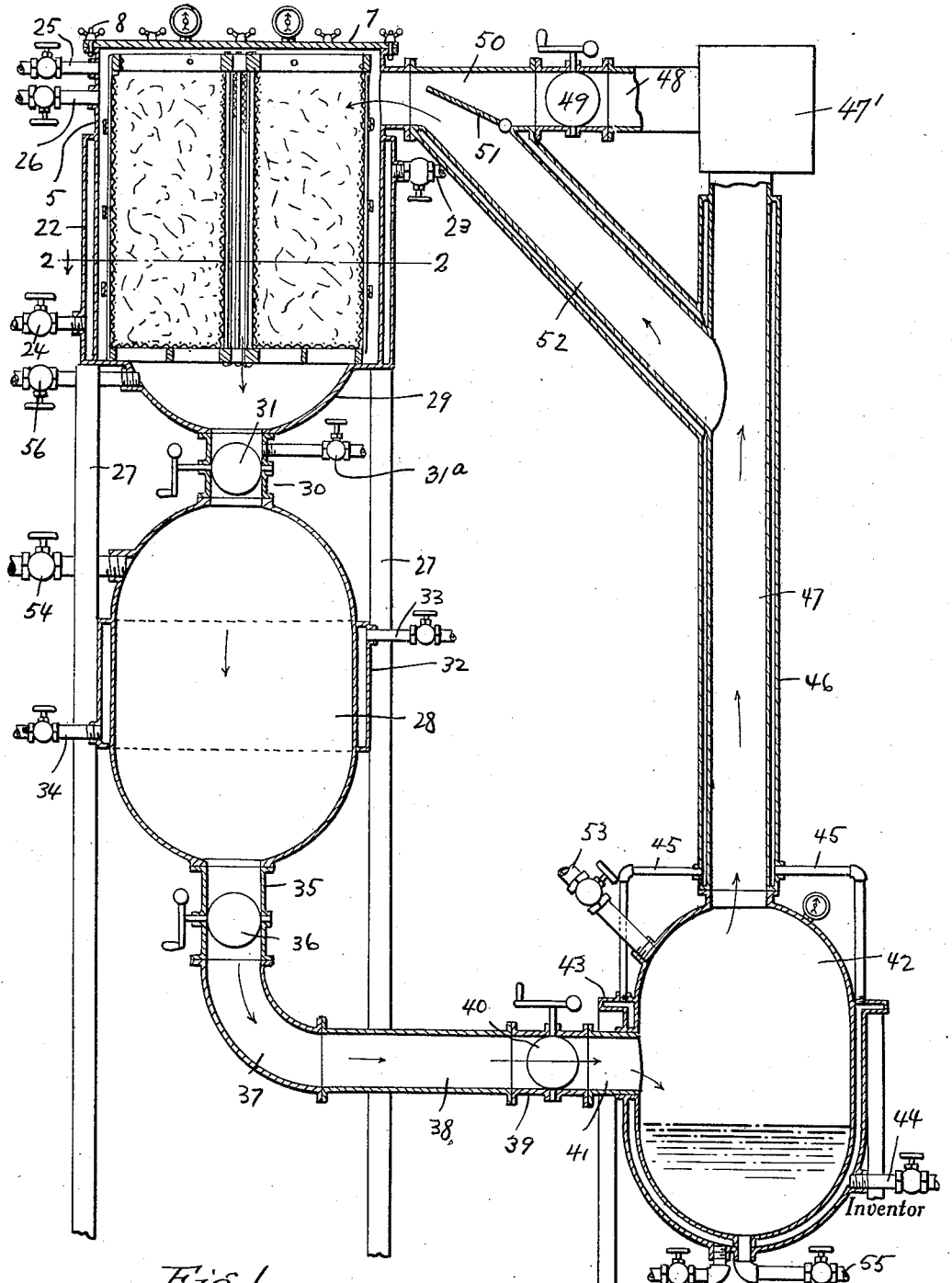

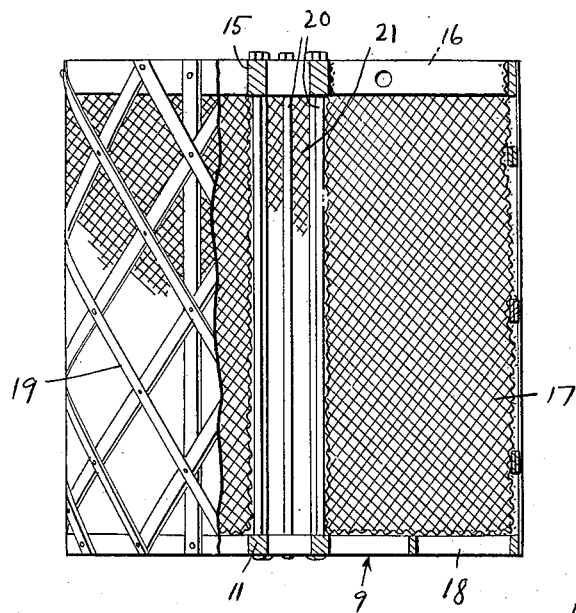
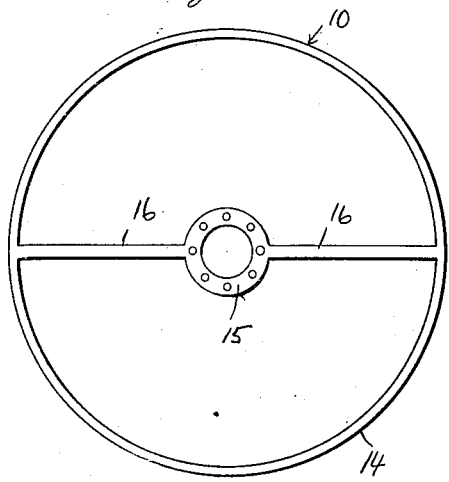
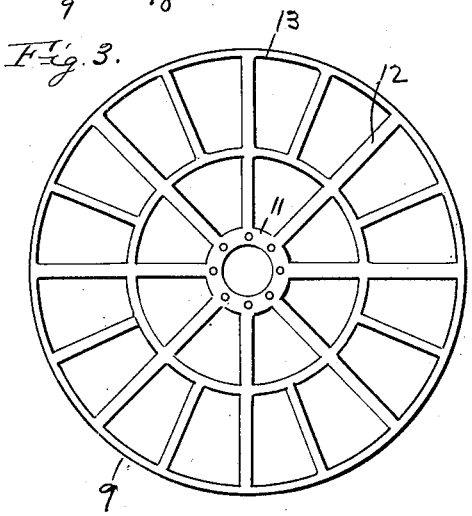

1,880,634

UNITED STATES PATENT OFFICE

WILL F. WOLF, OF CENTRALIA, WASHINGTON

APPARATUS FOR THE EXTRACTION OF RESINOUS SUBSTANCES FROM WOOD

Application filed August 6, 1929. Serial No. 383,955.

The present invention appertains to new and useful improvements in apparatus for extracting resinous or sticky substances from wood in which they are naturally contained and the invention also includes a novel process by which the substances are extracted through the use of the apparatus.

The principal object of this invention is to provide a simple process and a relatively cheap and inexpensive apparatus for the efficient extraction of pitchy substances from wood, to leave the wood suitable for paper pulp manufacture.

During the course of the following specification and claims, other important objects and advantages of the invention will become apparent.

In the drawings:

Figure 1 represents a vertical sectional view through the entire apparatus.

Figure 2 represents a foraminous basket for containing the wood yet to be treated.

Figure 3 represents a bottom plan view of the basket.

Figure 4 represents the upper annular frame for the basket, shown in plan view.

Referring to the drawings, wherein like numerals designate like parts, it will be seen that the present invention includes a relatively large container 5, preferably of steel and provided with a cover 7 suitably clamped thereto as at 8, so as to be air tight at the moderate pressure of two hundred and fifty pounds. The container 5 has a basket, shown clearly in Figure 2, mounted therein, and this basket consists of a bottom frame 9 and an upper frame 10. The bottom frame consists of a hub 11 with a plurality of spokes 12 connected therefrom and being connected at their ends by an annular rim 13. The upper frame 10 includes an annulus 14 and a hub 15, and spokes 16—16 extending diametrically from the hub 15 and being connected to the annulus 14. A cylinder 17 of foraminous material is arranged between the frame, its closed bottom 18 being suitably secured to the bottom frame 9, while its upper open end is suitably secured to the upper frame 10, while an external lattice work 19 serves to substantiate the side wall of the cylinder and also definitely connects the frames 9 and 10. Tie rods 20 connect the hubs 11 and 15 and arranged around the tie rods 20 to form a tube is a sheet of foraminous material which opens at its upper and lower end through the aforementioned hubs. The foraminous tube is employed to permit access of the solvent to be used to substantially every part of the mass of wood chips which will be contained in the basket while the apparatus is in operation.

The container 5 has a steam jacket 22 surrounding a substantial portion thereof and extends from the bottom thereof upwardly to terminate adjacent the top, thus making it possible to heat the container by steam, the same entering at 23 and exhausting at 24.

The numeral 25 denotes a steam outlet from the container and 26 is a vacuum pump connection. The whole steel container is supported by a structural steel frame 27 and within this frame is secured the vacuum chamber 28. The semi-spherical shaped bottom 29 of the container 5 is connected to the top of the vacuum chamber 28 and in communication therewith by the pipe 30 provided with a manually operable butterfly valve 31 therein. The vacuum chamber is of substantially the same capacity as the container 5. A substantially narrow cold water jacket 32 circumscribes the mid section of the vacuum chamber in the manner shown in Figure 1. Numerals 34 and 33 denote the inlet and outlet respectively of the jacket.

Communicating with the bottom of the chamber 28 is a relatively large pipe section 35 containing a manually operable butterfly valve 36. An elbow 37 extends from the section 35, while a pipe section 38 connects the opposite end of the elbow to the pipe section 39 containing another butterfly valve 40 of manual manipulation.

The pipe section 39 connects to a nipple 41 protruding from the distillation reservoir 42. This reservoir is provided with a steam jacket 43, which encloses its bottom and a substantial portion of its side wall. The steam enters at 44 and passes through the jacket to the pipes 45—45 which are connected to the jacket 46 encompassing the vertical pipe 47. The vertical pipe extends from the top of the distillation reservoir 42 and connects to a solvent pump 47' which has its outlet through the horizontal pipe 48, which has a butterfly valve 49 interposed therein. The pipe 48 connects to a pipe section 50, within which is the manually operable gate valve 51, for cutting off communication between the inclined branch pipe 52 leading from the vertical pipe 47, with the container 5.

It is thought that benzene, called benzol, $C_6H_6$, gasolene, or other hydro-carbon of similar nature, will perhaps be the best solvent for this work, the same being supplied to the reservoir 42 through the pipe 53.

In the operation of the apparatus, the foraminous basket is filled with dry chips of the wood to be treated, the same being of a size just a trifle smaller than the ordinary sized chips used in the digester of pulp mills. The cover 7 is clamped down tightly upon the top of the container 5 and all valves leading into or out of the container 5 are closed, namely valves 25, 26, 31, 49, 51, 56 and 31A. The vacuum pump is started and valve 26 is opened.

While chamber 5 and its contents are being exhausted, the valve 54 is opened as well as the valves 36 and 40 which permits all of the air to be exhausted from the apparatus. After this is done, and it need not be done excepting at the beginning of the operation, for the vacuum will later be maintained due to the condensation of the solvent vapor, valves 36, 40 and 54 are closed. Now that the air is exhausted from the entire apparatus including the material to be extracted, the solvent is allowed to enter the chamber 42 until it is approximately half full. Steam is then turned on at 44, which brings the solvent to the boiling point and the vapors ascend through pipe 47 to the solvent vapor pumps 47', and also ascend the branch pipe 52 to the valve 51. The boiling of the solvent is continued until a slight pressure is reached, and then the valve 51 is opened and the vapor rushes into the evacuated chamber 5 and the wood chips that have been exhausted in the same. When the gauges on the container no longer show any vacuum in the same, the pump is started and the solvent vapors are pumped into the chamber 5 by opening valve 49 and closing the branch pipe 52 by the gate valve 51. The pump automatically maintains the desired pressure. When sufficient time has elapsed to about saturate the vapor pumped in, with the resinous material, valve 49 is closed and then valve 31 is suddenly opened and due to the vacuum in chamber 28, the dissolving liquid and vapor rush with their load of resinous material into it, until both chambers have attained the same pressure. The valve 31 is closed and the process of pumping the vapor into the container 5 is repeated as at first. Again it is stopped when the required time has elapsed and valve 49 closed and 31 is opened until the pressures are about equal in 28 and 5 when the valve 31 is closed. This operation may be repeated as many times as is necessary to completely remove the resinous material. Following the process, however, from chamber 28, which may be one-third full with solvent saturated material which is now in a liquid state, owing to the fact that this chamber is cooled by a water jacket and this causes a vapor to condense and a vacuum results which is what is desired because of the next batch to be exhausted.

Now this liquid in chamber 28 is allowed to flow into the pipe 38 by opening valve 36. There must be enough liquid material in the vacuum chamber to more than fill the pipe 38 when the valve 36 can be closed and the valve 40 opened which allows the liquid to flow into the chamber 42 where distillation is in process. When valve 40 is closed, vapors from chamber 42 enter and are enclosed in pipes 37 and 38. These vapors will condense and create a vacuum which will draw the next batch from above.

The solvent having a lower boiling point than the material with which it is saturated will now distill off and leave the concentrated resinous material in chamber 42, where it can be drawn off through the pipe 55. The dissolving liquid and vapor have thus carried the resinous material from the chips down into the chamber 42 and are ready for another cycle in the process until all resinous material has been removed. When that has been accomplished, all valves to chamber 5 are closed, except 25 and 56, for through 56 steam under high pressure is forced through the chips removing the last traces of solvent, which is not soluble in it, but is volatilized by it and passes out with the same, through 25. The steam is passed into a condensing tank where the solvent floats on top of the water and can thus be drawn off and used over again.

The steaming process is stopped when all solvent is removed or when no more solvent condenses with the steam. The lid is then removed and the basket of chips hoisted out hot from the steam and dumped into the digester ready to be treated for pulp. That is the object of the process to remove the resinous materials from woods that otherwise are too pitchy for paper manufacture, for example, fir wood. The extracted resinous material can be subjected to distillation and yields unrefined rosin and turpentine, of enough value to pay for the expense of processing.

The foregoing specification describes the improved apparatus and the operation thereof and it is to be understood that certain changes in the specific shape, size and materials may be resorted to, without departing from the spirit or scope of the invention as claimed hereinafter.

What is claimed is:

1. An apparatus for extracting resinous substances of wood comprising a container for the wood, a vacuum chamber connected with the container, a distillation chamber connected with the vacuum chamber, means for introducing a solvent into the distillation chamber, means for heating the solvent and conducting the resultant vapors into the container, means for exhausting the air from the entire system before the solvent is heated, means for closing communication between the container and the vacuum chamber while the vapors are being introduced into the container, means for forcing the vapors from the distillation chamber into the container after the natural flow of the vapors from the distillation chamber into the container ceases to create a pressure in the container, after which communication between the container and vacuum chamber is again established to permit the fluid in the container to pass into the vacuum chamber, means for controlling communication between the vacuum chamber and the distillation chamber to control the flow of fluid from the vacuum chamber into the distillation chamber and to permit vapors to collect in the vacuum chamber, after the same has been placed out of communication with the container, and means for condensing the vapors in the vacuum chamber to create a vacuum therein to draw fluid from the container when said container is again placed in communication with the vacuum chamber.

2. An apparatus for extracting resinous substances from wood comprising a container for the wood, a vacuum chamber connected with the container, a valve in said connection, a distillation chamber, a conduit connecting the same with the vacuum chamber, a pair of valves in said conduit, means for introducing solvent into the distillation chamber, means for heating the solvent to produce vapor, a conduit for connecting the distillation chamber with the container for conveying the vapors into the container, means for creating a vacuum in the entire system before the solvent is heated, whereby the vapors will enter the container when the first-mentioned valve is closed, a pump for forcing the vapors into the container after the pressure in the container reaches a degree which will prevent the natural flow of vapors thereinto, means for condensing the vapors in the vacuum chamber to form a vacuum therein which will act to draw the fluid from the container when the first-mentioned valve is opened.

3. An apparatus for extracting resinous substances from wood comprising a container, a cage therein for holding the wood, said cage having a perforated centrally arranged tubular part, a vacuum chamber connected with the container, a distillation chamber, a conduit connecting the distillation chamber with the vacuum chamber, a conduit connecting the distillation chamber with the container, a branch passage connecting a part of the last-mentioned conduit with the container, a pump in said branch passage, a valve in that part of the branch passage between the pump and the container, a valve for controlling that part of the conduit which by-passes the branch conduit, means for creating a vacuum in the entire system at the beginning of the operation, means for introducing solvent into the distillation chamber, means for heating the solvent to create a vapor, a valve controlling communication between the container and the vacuum chamber, a pair of valves in the conduit connecting the vacuum chamber with the distillation chamber, and means for cooling the vacuum chamber to condense the vapors to create a vacuum therein which acts to draw fluid from the container when the valves are open, between the vacuum chamber and the container.

In testimony whereof I affix my signature.

WILL F. WOLF.